United States Patent
Harasaki

(10) Patent No.: US 8,521,406 B2
(45) Date of Patent: Aug. 27, 2013

(54) TRAVELING VEHICLE SYSTEM

(75) Inventor: Kazumi Harasaki, Aichi (JP)

(73) Assignee: Murata Machinery, Ltd., Kyoto-shi (JP)

( * ) Notice: Subject to any disclaimer, the term of this patent is extended or adjusted under 35 U.S.C. 154(b) by 241 days.

(21) Appl. No.: 13/141,322

(22) PCT Filed: Oct. 14, 2009

(86) PCT No.: PCT/JP2009/005344
§ 371 (c)(1),
(2), (4) Date: Jun. 21, 2011

(87) PCT Pub. No.: WO2010/073446
PCT Pub. Date: Jul. 1, 2010

(65) Prior Publication Data
US 2012/0136516 A1    May 31, 2012

(30) Foreign Application Priority Data

Dec. 26, 2008 (JP) .................................. 2008-334045

(51) Int. Cl.
*B61B 13/00* (2006.01)
*G05D 1/02* (2006.01)
*G06F 19/00* (2011.01)

(52) U.S. Cl.
USPC ........................ 701/117; 701/118; 198/348

(58) Field of Classification Search
USPC .............. 701/117, 118, 119; 198/348, 346.2, 198/347.1
See application file for complete search history.

(56) References Cited

U.S. PATENT DOCUMENTS

| 8,019,468 B2 | 9/2011 | Hayashi et al. |
| 8,245,647 B2 * | 8/2012 | Oguro et al. ................... 104/96 |
| 2009/0208313 A1 | 8/2009 | Hayashi et al. |
| 2011/0221585 A1 * | 9/2011 | Higuchi et al. ............. 340/438 |

FOREIGN PATENT DOCUMENTS

| CN | 101042588 | | 9/2007 |
| CN | 101443717 | A | 5/2009 |
| EP | 2053481 | A1 | 4/2009 |
| JP | 7-225614 | A | 8/1995 |
| JP | 8-211937 | A | 8/1996 |
| JP | 11-85280 | A | 3/1999 |
| JP | 2003-29837 | A | 1/2003 |
| JP | 2004-252631 | A | 9/2004 |
| JP | 2006-195859 | | 7/2006 |

(Continued)

OTHER PUBLICATIONS

Translation of the International Preliminary Report on Patentability based on PCT/JP2009/005344 filed Oct. 14, 2009.

(Continued)

*Primary Examiner* — Tan Q Nguyen
(74) *Attorney, Agent, or Firm* — Adli Law Group P.C.

(57) ABSTRACT

A traveling vehicle system (100) has a first closed path (131) and a second closed path (132) each being a one-way path, and having exit points and entrance points. The traveling vehicle system (100) includes a storage unit (112) storing an exit point table (113) and an entrance point table (114). When moving from the first closed path (131) to the second closed path (132), the traveling vehicle (200) moves via an exit point of the first closed path (131) and an entrance point of the second closed path (132). The exit point and the entrance point are respectively shown in the exit point table (113) and the entrance point table (114) stored in the storage unit (112).

4 Claims, 12 Drawing Sheets

(56) References Cited

FOREIGN PATENT DOCUMENTS

| | | |
|---|---|---|
| JP | WO2007/132651 A1 | 11/2007 |
| KR | 2008-112396 A | 1/2003 |
| KR | 2008-112396 A | 12/2008 |
| TW | 517183 B | 1/2003 |

OTHER PUBLICATIONS

Written Opinion of the International Searching Authority.
Office Action mailed Jan. 7, 2013 for the corresponding CN patent application No. 200980152502.3.

* cited by examiner

TRAVELING VEHICLE SYSTEM

TECHNICAL FIELD

The present invention relates to traveling vehicle systems including traveling vehicles for transporting articles.

BACKGROUND ART

Traveling vehicle systems have been used for transporting articles, using traveling vehicles including overhead traveling vehicles.

A semiconductor factory producing semiconductor devices is, for example, separated into areas called "bays". One bay is assigned for each production process. Each bay has a closed path on which overhead traveling vehicles travel in one direction.

On each closed path, each of the traveling vehicles transports semiconductor wafers between manufacturing machines in the bay.

Furthermore, the closed paths of the bays are connected with each other via a connecting path. A product undergoes one process in a bay. Then the product is picked up by an overhead traveling vehicle in the bay, and transported to another bay in the succeeding process through the connecting path.

Including the closed paths, the connecting path connecting the closed paths with each other, and overhead traveling vehicles, a traveling vehicle system has to efficiently transport articles.

Hence there are techniques disclosing how to efficiently move the traveling vehicles in the traveling vehicle system.

For example, a technique in Patent Literature 1 introduces a controller for controlling overhead traveling vehicles. The controller keeps tracking on the congestion state of the traveling path, and informs each of the overhead traveling vehicles of the state. Hence each overhead traveling vehicle can determine a traveling route depending on the congestion state.

CITATION LIST

Patent Literature

[PTL 1]
Japanese Unexamined Patent Application Publication No. 2006-195859

SUMMARY OF INVENTION

Technical Problem

In the above conventional technique, the traveling vehicle system having the traveling vehicles suffers from the following problem: When each traveling vehicle determines a traveling route, options of the routes to take increases as the number of the bays increases. For each traveling vehicle, having more options of the paths increases the processing load which the traveling vehicle has to handle for determining the route.

As described above, the bays are connected with each other by the connecting path, and the traveling vehicles travels between the bays. Due to the structure, for example, the number of the traveling vehicles assigned for each of the bays may be unbalanced in view of an amount of work to be handled for each bay.

Thus the number of the traveling vehicles at each bay needs to be adjusted (hereinafter referred to as "dispatched").

Conventionally, moreover, the closed path of each bay separately has (i) exit points at which the traveling vehicles exit to the connecting path, and (ii) entrance points at which the traveling vehicles enters from the connecting path to the closed path.

In other words, the traveling vehicles travel on a route connecting an exit point of one closed path with an entrance point of another closed path.

Hence, in order to have the traveling vehicles efficiently dispatched, thorough combinations of the exit points and the entrance points are required for each inter-bay connection between bays (between closed paths) in the traveling vehicle system.

Accordingly, as the number of the bays increases, there will be more combinations of the exit points and the entrance points of the bays, leading to more options for determining the route in dispatching the traveling vehicles.

Furthermore, in the case where the following problems have found such as; a trouble has developed in a part of the connecting path, another traveling vehicle has stopped on the connecting path, and a part of the traveling path is unusable due to the maintenance, the traveling vehicle might not be able to arrive at the destination bay even though the traveling vehicle is to travel according to the set combination.

The present invention is conceived in view of the above problems and has an object to provide traveling vehicle systems including closed paths and a connecting path connecting the closed paths with each other, and in particular, a traveling vehicle system for efficiently operating traveling vehicles between the closed paths.

Solution to Problem

In order to solve the above problems, a traveling vehicle system according to an aspect of the present invention includes closed paths each being a one-way path, a connecting path being a one-way path and connecting the closed paths with each other, and a traveling vehicle moving along the closed paths and the connecting path. Each of the closed paths has (i) exit points at which the traveling vehicle can exit to the connecting path and (ii) entrance points at which the traveling vehicle can enter from the connecting path. The traveling vehicle system includes a storage unit which stores exit-entrance information showing a combination of an exit point and an entrance point respectively representing a start and an end of a shortest route on which the traveling vehicle can move between the closed paths, the exit point and the entrance point being respectively included in the exit points and the entrance points, and when moving from one of the closed paths to an other one of the closed paths, the traveling vehicle moves via the exit point of the one of the closed paths, and the entrance point of the other one of the closed paths, the exit point and the entrance point being shown in the exit-entrance information stored in the storage unit.

According to the structure, the storage unit stores the exit-entrance information showing combinations of the exit points and the entrance points, the combinations forming the shortest routes between closed paths.

Thus when moving a traveling vehicle from one of the closed paths to another one of the closed paths, the traveling vehicle system refers to the exit-entrance information so that the traveling vehicle system can easily specify the exit point and the entrance point for the most efficient move of the traveling vehicle.

In other words, the traveling vehicle system eliminates the need for searching for one route out of many candidate routes, and facilitates efficient moves of the traveling vehicle.

Furthermore, the traveling vehicle system may further include: a generating unit which generates the exit-entrance information based on information showing the exit points and the entrance points of each of the closed paths; and a monitoring unit which monitors a traveling environment to determine whether or not it is difficult or impossible for the traveling vehicle to pass through either any one of the exit points or any one of the entrance points of each of the closed paths, the traveling environment being monitored in a predetermined area of a traveling path formed of the closed paths and the connecting path, wherein, in the case where the monitoring unit determines that it is difficult or impossible for the traveling vehicle to pass through either the any one of the exit points or the any one of the entrance points of each of the closed paths, the generating unit may exclude the any exit point and the any entrance point for which it is determined that it is difficult or impossible for the traveling vehicle to pass through, and update the exit-entrance information.

According to the structure, even though there are any problems contributing to deterioration of the traveling environment, such as congestion, the traveling system can always keep the most recent exit-entrance information based on such problems.

Thus when congestion develops, the traveling system specifies an exit point and an entrance point for the traveling vehicle to move in the most efficient manner under the problems. In other words, when the traveling environment deteriorates due to a problem, the traveling system selects the shortest route for the traveling vehicle to never fail to arrive at the destination at that point. Accordingly, the present invention makes possible an efficient move of the traveling vehicle depending on the traveling environment.

The traveling vehicle system may further include: traveling vehicles including the traveling vehicle; and a controller which controls each of the traveling vehicles, wherein the controller may include: the storage unit; and a moving instructing unit which gives, when moving one of the traveling vehicles from one of the closed paths to an other one of the closed paths, an instruction to the one traveling vehicle so that the one traveling vehicle moves via the exit point of the one of the closed paths and the entrance point of the other one of the closed paths, the exit point and the entrance point being shown in the exit-entrance information stored in the storage unit.

According to the structure, the controller, positioned on a higher level in command than the traveling vehicles, can consolidate the exit-entrance information. Thus when another traveling vehicle joins the traveling vehicle system, the controller can give an appropriate instruction to the other traveling vehicle with reference to the exit-entrance information.

When moving the one traveling vehicle from the one closed path to the other closed path, the moving instructing unit may specify, as the one traveling vehicle, a traveling vehicle positioned upstream of and closest to the exit point indicated in the exit-entrance information, and give the instruction to the specified traveling vehicle.

According to the structure, when the traveling vehicles are delivered; that is when the number of the traveling vehicles is adjusted among closed paths, the moving instructing unit specifies, as a traveling vehicle to be moved, one of the traveling vehicles which belong to the starting closed path. Here the specified vehicle takes the shortest time to exit from the starting closed path. Hence the present invention makes possible efficient delivery of the traveling vehicles.

In addition, the present invention may implement a method for controlling a move of a traveling vehicle, the method of which includes characteristics operation steps in the traveling vehicle system of the present invention. Furthermore, the present invention may provide a control program for causing the controller; namely a control device, to execute each of the steps.

Advantageous Effects of Invention

The traveling vehicle system in the present invention stores combinations of exit points and entrance points, the combinations which are the shortest routes for a traveling vehicle moving from one of two closed paths to the other.

Thus, when traveling from one of the two closed paths to the other, the traveling vehicle may travel via the exit point and the entrance point indicated in exit-entrance information. In other words, the traveling vehicle can efficiently travel from one closed path to the other with a short processing time and a little amount of load, eliminating the need for a complex route search.

Furthermore, the storage unit may be included in either the traveling vehicle or the controller for controlling the traveling vehicle. When the controller includes the storage unit, for example, the controller can cause the traveling vehicle to efficiently travel from one closed path to the other with a short processing time with a little amount of load, eliminating the need for a complex route search.

In other words, the present invention can provide a traveling vehicle system for efficiently moving a traveling vehicle between closed paths.

DESCRIPTION OF THE EMBODIMENT

Embodiment

Described hereinafter is an embodiment of the present invention with reference to the drawings.

Described first is a structure of a traveling vehicle system 100 according to the embodiment with reference to FIGS. 1 to 4.

Figure 1:
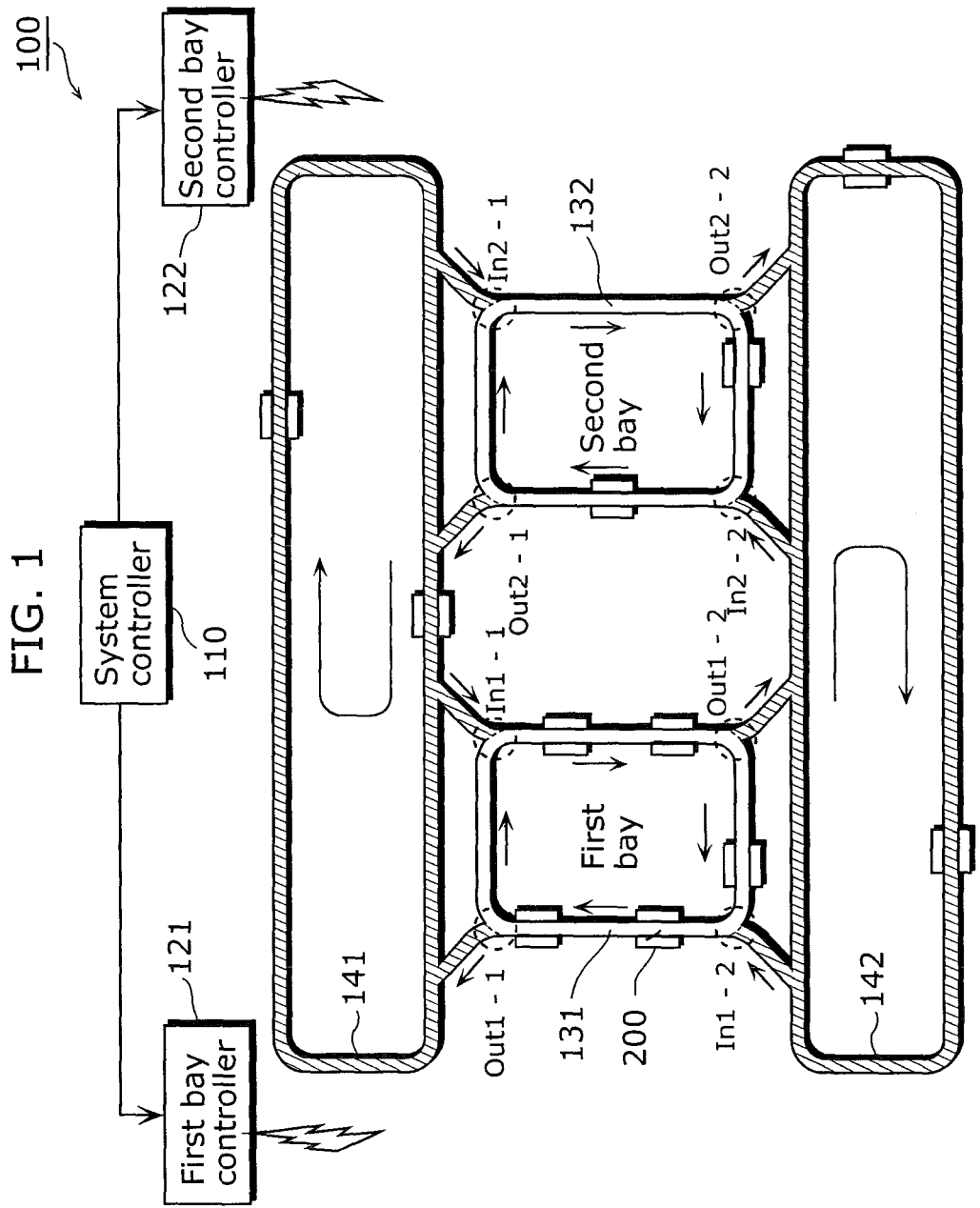
FIG. 1 schematically shows a hardware structure of a traveling vehicle system according to an embodiment of the present invention.

FIG. 1 schematically shows a hardware structure of the traveling vehicle system 100 according to the embodiment of the present invention.

As shown in FIG. 1, the traveling vehicle system 100 includes a system controller 110, a first bay controller 121, a second bay controller 122, a first closed path 131, a second closed path 132, a first connecting path 141, a second connecting path 142, and traveling vehicles 200.

It is noted that the traveling vehicles 200 in the embodiment are overhead traveling vehicles which move along a traveling path such as the first closed path 131 mounted on the ceiling.

The traveling vehicle system 100 shown in FIG. 1 is installed in a factory manufacturing semiconductor devices for example. The first closed path 131 and the second closed path 132 are respectively provided to a first bay and a second bay.

The traveling vehicles 200 in the first bay; namely the traveling vehicles 200 on the first closed path 131, are controlled with a wireless signal from the first bay controller 121. The traveling vehicles 200 in the second bay; namely the traveling vehicles 200 on the second closed path 131, are controlled with a wireless signal from the second bay controller 121.

According to an instruction from the system controller 110, the first bay controller 121 and the second bay controller 122 control each of the traveling vehicles 200. In other words, each of the traveling vehicles 200 is controlled by the system controller 110 via the first bay controller 121 or the second bay controller 122.

The first connecting path 141 and the second connecting path 142 are shaded traveling paths in FIG. 1. The traveling paths connect the first closed path 131 with the second closed path 132.

By traveling on the first connecting path 141 or the second connecting path 142, the traveling vehicles 200 can move from one of the first closed path 131 and the second closed path 132 to the other.

It is noted that FIG. 1 shows a top-view layout of the first closed path 131, the second closed path 132, the first connecting path 141, and the second connecting path 142. Moreover, each of the paths is a clockwise one-way traffic.

Each of the first closed path 131 and the second closed path 132 has exit points and entrance points. At the exit points, the traveling vehicles 200 exit to each of the first connecting path 141 and the second connecting path 142. At the entrance points, the traveling vehicles 200 enter from each of the first connecting path 141 and the second connecting path 142.

Specifically, the first closed path 131 has an exit point "Out 1-1" to the first connecting path 141 and an exit point "Out 1-2" to the second connecting path 142. The first closed path 131 has an entrance point In 1-1 from the first connecting path 141 and an entrance point In 1-2 from the second connecting path 142.

In addition, the second closed path 132 has an exit point Out 2-1 to the first connecting path 141 and an exit point Out 2-2 to the second connecting path 142. The second closed path 132 has an entrance point "In 2-1" from the first connecting path 141 and an entrance point "In 2-2" from the second connecting path 142.

When traveling from one of the first closed path 131 and the second closed path 132 to the other, the traveling vehicles 200 need to (i) exit at any one of the exit points provided on the starting closed path to the first connecting path 141 or the second connecting path 142, and (ii) enter in the destination closed path at any one of the entrance points provided thereon.

In travelling, the traveling vehicles 200 have to follow the one-way traffic on the first closed path 131, the second closed path 132, the first connecting path 141, and the second connecting path 142.

It is noted that in FIG. 1, only two closed paths; namely the first closed path 131 and the second closed path 132, are illustrated as the closed paths included in the traveling vehicle system 100 in order to clarify the present invention. Furthermore, only two connecting paths; namely the first connecting path 141 and the second connecting path 142, are illustrated as the connecting paths for connecting closed paths with each other.

However, the number of the closed paths and the connecting paths included in the traveling vehicle system 100 shall not be limited to two each; instead, the traveling vehicle system 100 may include three or more closed paths and the connecting paths.

In the case where the traveling-vehicle system 100 has three or more closed paths and the connecting paths, each closed path has two or more exit points and entrance points serving as connections to at least one connecting path.

Figure 2:
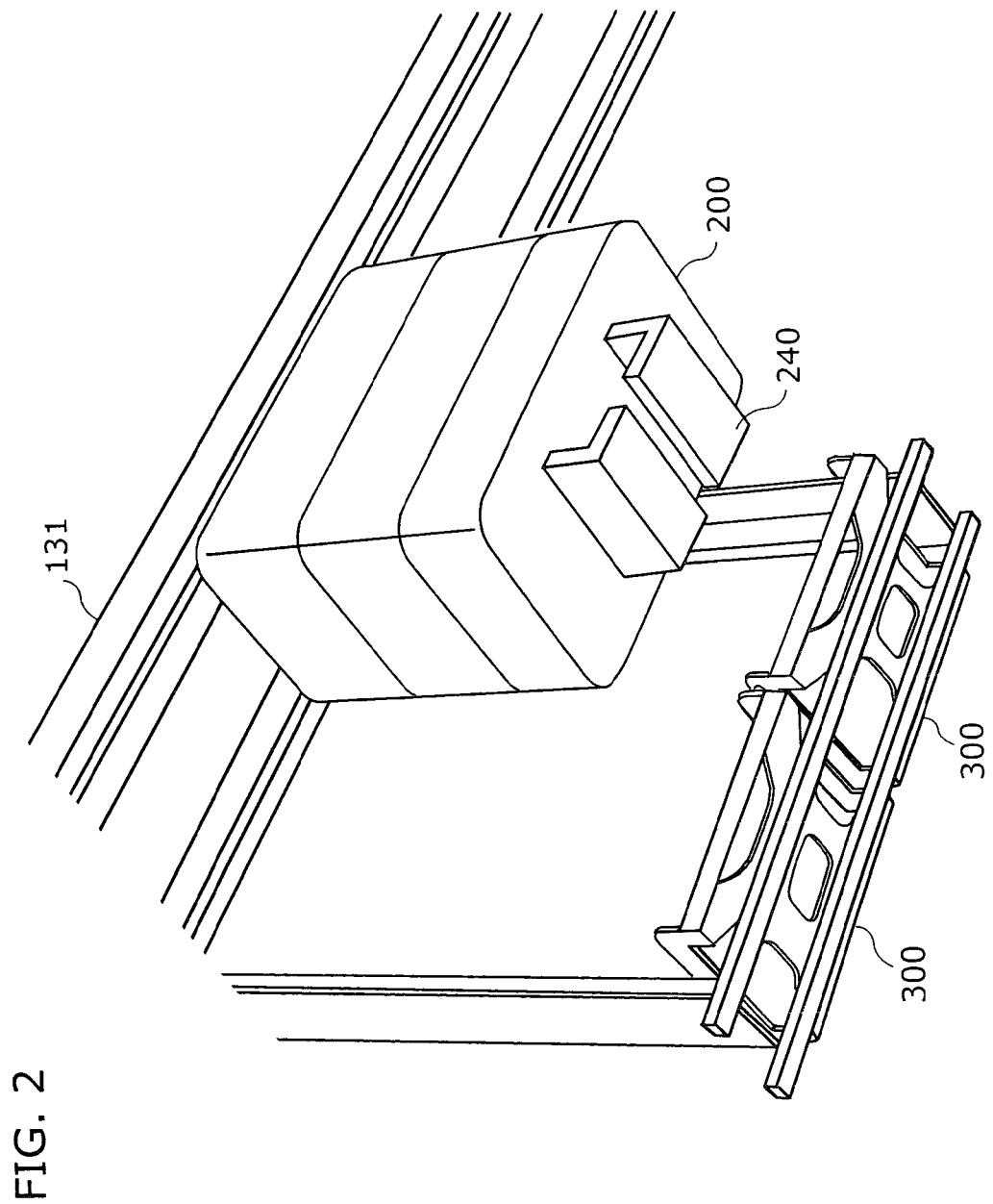
FIG. 2 is a perspective view showing an outline of the traveling vehicle according to the embodiment.

FIG. 2 is a perspective view showing an outline of the traveling vehicles 200 according to the embodiment.

It is noted that FIG. 2 shows an outline of one of the traveling vehicles 200 on the first closed path 131. The other traveling vehicles 200 also have similar appearances.

As shown in FIG. 2, the traveling vehicles 200 are overhead traveling vehicles which move along a rail forming a traveling path such as the first closed path 131. Moreover, each of the traveling vehicles 200 has a holding unit 240 which holds an article.

According to the instruction from the system controller 110, for example, the traveling vehicle 200 moves to a point on the first closed path 131, and descends to a transfer port on which an article to be transported is placed. Then the traveling vehicle 200 holds the article placed on the transfer port and ascends. According to the instruction from the system controller 110, the traveling vehicle 200 moves to the next transfer port. When moving to the next transfer port, the traveling vehicle 200 descends, puts the article held by the holding unit 240, and ascends.

The traveling vehicles 200 repeat such operations and transfer materials between manufacturing machines in the first bay. Similarly, in the second bay, the traveling vehicles 200 transfer materials between manufacturing machines.

Moving between the first bay and the second bay, the traveling vehicles 200 transport materials therebetween.

Furthermore, the first closed path 131 has platforms 300. On the platforms 300, articles to be transported to the traveling vehicles 200 are temporarily placed. Such platforms 300 are provided to the second closed path 132.

Figure 3:
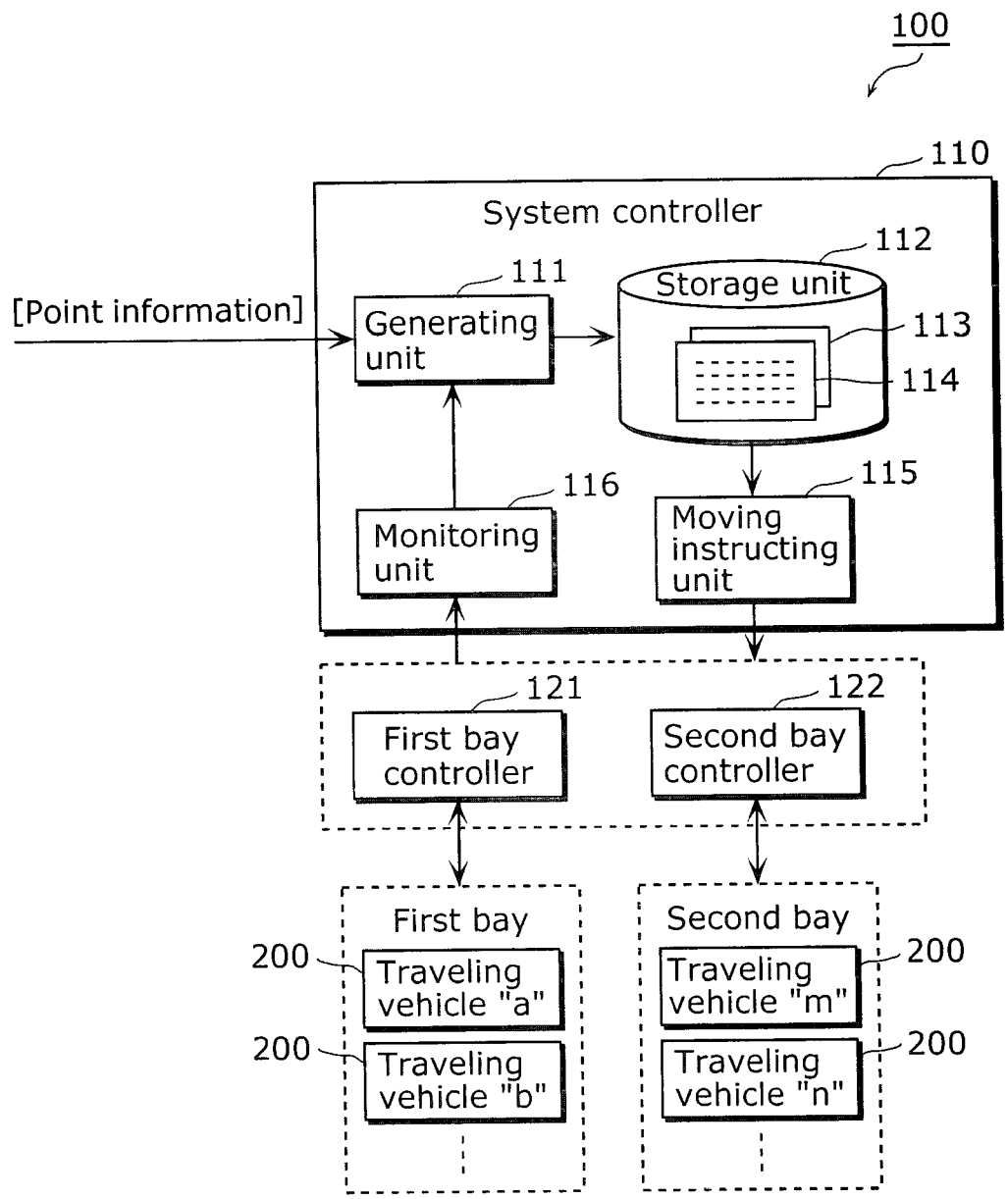
FIG. 3 shows a functional structure of the traveling vehicle system according to the embodiment of the present invention.

FIG. 3 shows a functional structure of the traveling vehicle system 100 according to the embodiment of the present invention.

As shown in FIG. 3, the system controller 110 includes a generating unit 111, a storage unit 112, a moving instructing unit 115, and a monitoring unit 116 as key constituent features.

The generating unit 111 is a processing unit for generating an exit point table 113 and an entrance point table 114.

Specifically, the generating unit 111 obtains point information indicating the exit points and the entrance points for each of the closed paths. Based on the obtained point information, the generating unit 111 further calculates a traveling distance between the closed paths. In other words, the generating unit 111 calculates traveling distances for all the combinations of the exit points and the entrance points which the traveling vehicle 200 can take.

Based on the calculation result, the generating unit 111 obtains combinations of the exit points and the entrance points, the combinations which represent the shortest routes between the closed paths. Furthermore, the generating unit 111 generates the exit point table 113 and the entrance point table 114 showing the combinations of the exit points and the entrance points.

The generated exit point table 113 and the entrance point table 114 are stored in the storage unit 112. The tables are updated when the layout of the traveling paths is updated and a change of a traveling environment, such as congestion, is observed.

Data formation of the exit point table 113 and the entrance point table 114 is described hereinafter with reference to FIG. 4.

The moving instructing unit 115 is a processing unit which gives an instruction to move to each of the traveling vehicles 200.

For example, when moving a traveling vehicle 200 from the first closed path 131 to the second closed path 132, the moving instructing unit 115 gives the traveling vehicles 200 an instruction to move. According to the instruction, the traveling vehicle 200 moves via an exit point of the first closed path 131 and the entrance point of the second closed path 132. The exit point and the entrance point are respectively shown in the exit point table 113 and the entrance point table 114.

The moving instructing unit 115 gives the instruction to move to the traveling vehicle 200 to move via the first bay controller 121 or the second bay controller 122.

The monitoring unit 116 is a processing unit to monitor a traveling environment to determine whether or not it is difficult or impossible for the traveling vehicle 200 to pass through either any one of the exit points or any one of the entrance points of the closed paths. Here the traveling environment is monitored in a predetermined area within a traveling path formed of the closed paths and the connecting path.

Specifically, the monitoring unit 116 obtains, from each of the first bay controller 121 and the second bay controller 122, (i) information indicating congestion developing on the traveling path, and the location of the congestion, and (ii) information indicating an unusable part of the traveling path due to the problem on the rail or the maintenance work. The monitoring unit 116 makes the above determination based on additionally obtained information.

Figure 4:
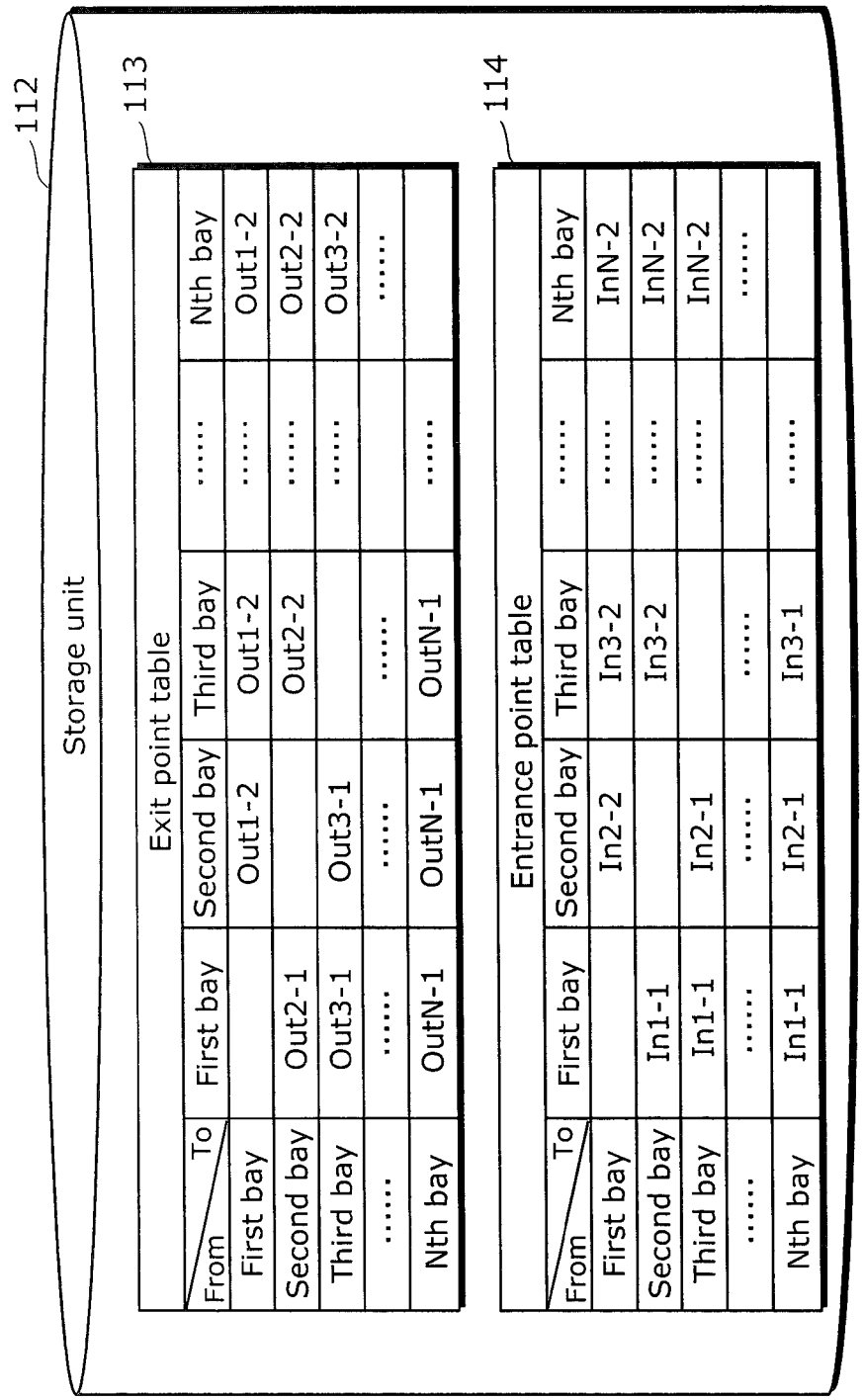
FIG. 4 exemplifies data formation of an exit point table and an entrance point table according to the embodiment.

FIG. 4 exemplifies data formation of the exit point table 113 and the entrance point table 114 according to the embodiment.

As shown in FIG. 4, the exit point table 113 and the entrance point table 114 show exit points and the entrance points. Here a combination of one of the exit points and one of the entrance points represents the start and the end of the shortest route on which the traveling vehicle 200 can move between the closed paths.

When the traveling vehicle 200 moves from the first bay to the second bay, for example, the exit point table 113 is referred to so that the exit point is found to be "Out 1-2".

Here the traveling vehicle 200 refers to the entrance point table 114 to find out that the entrance point is "In 2-2".

In other words, the traveling vehicle 200 on the first closed path 131 exits at "Out 1-2" on the first closed path 131 to the second connecting path 142, goes through "In 2-2", and enters in the second closed path 132. This makes the most efficient travel from the first closed path 131 to the second closed path 132.

It is noted that information groups of the exit point table 113 and the entrance point table 114 exemplify the exit-entrance information in the traveling vehicle system according to an implementation of the present invention.

FIGS. 5 to 12 show operations of the above-described traveling vehicle system 100.

Figure 5:
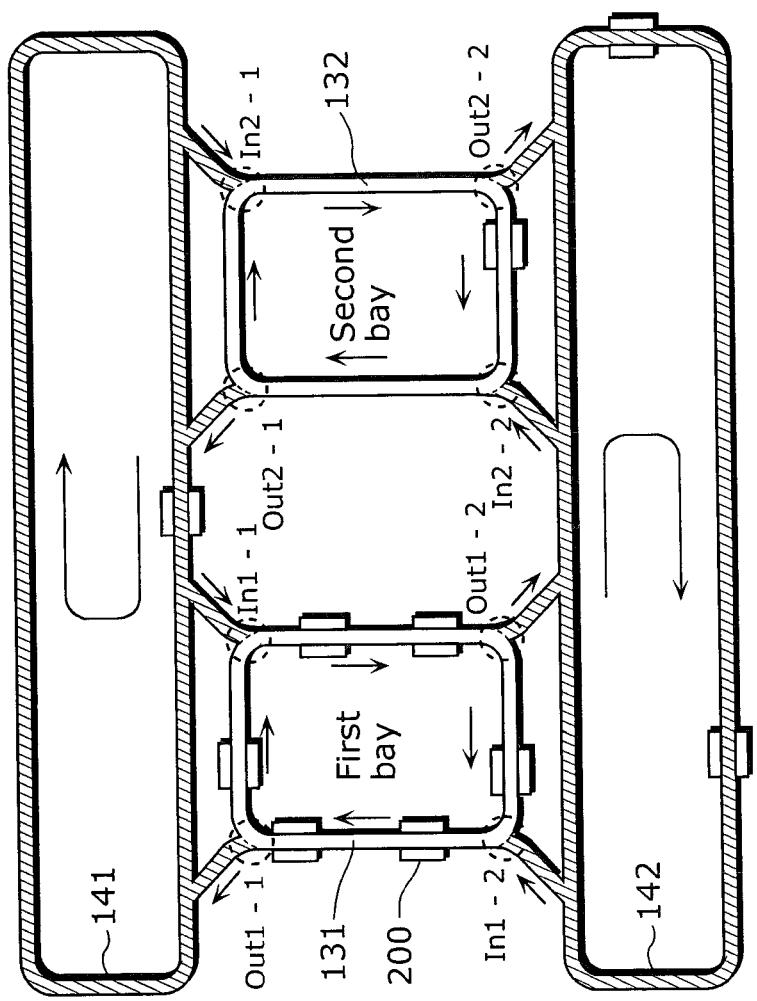
FIG. 5 shows a dispatching process in the traveling vehicle system according to the embodiment.
Figure 6:
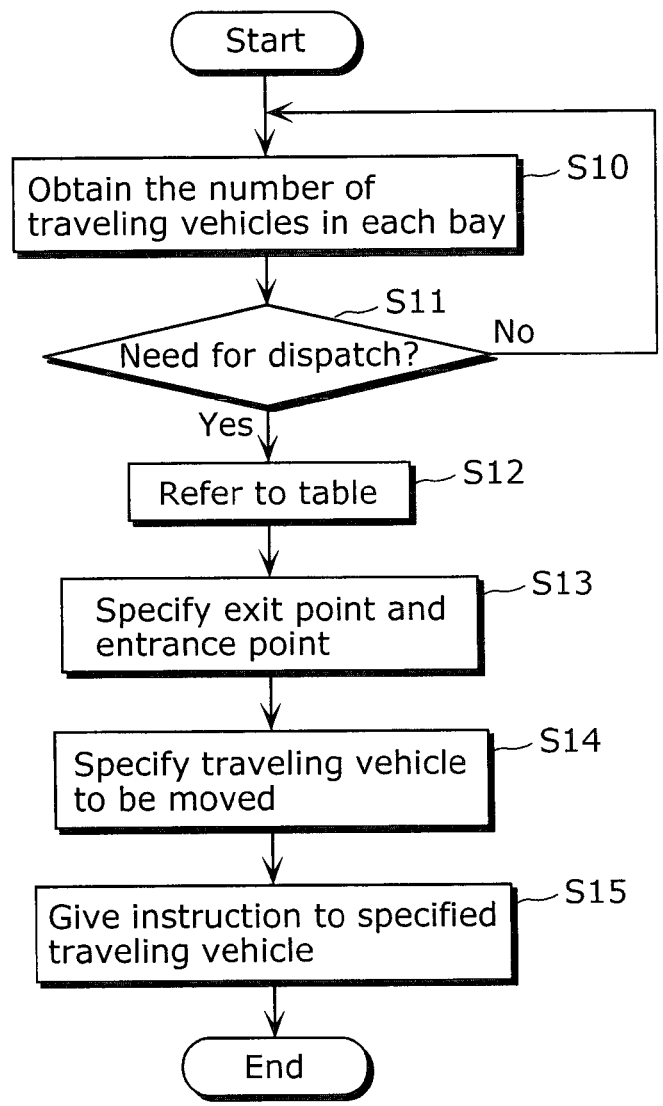
FIG. 6 is a flow chart schematically showing a flow of a dispatching process executed by a system controller according to the embodiment.
Figure 7:
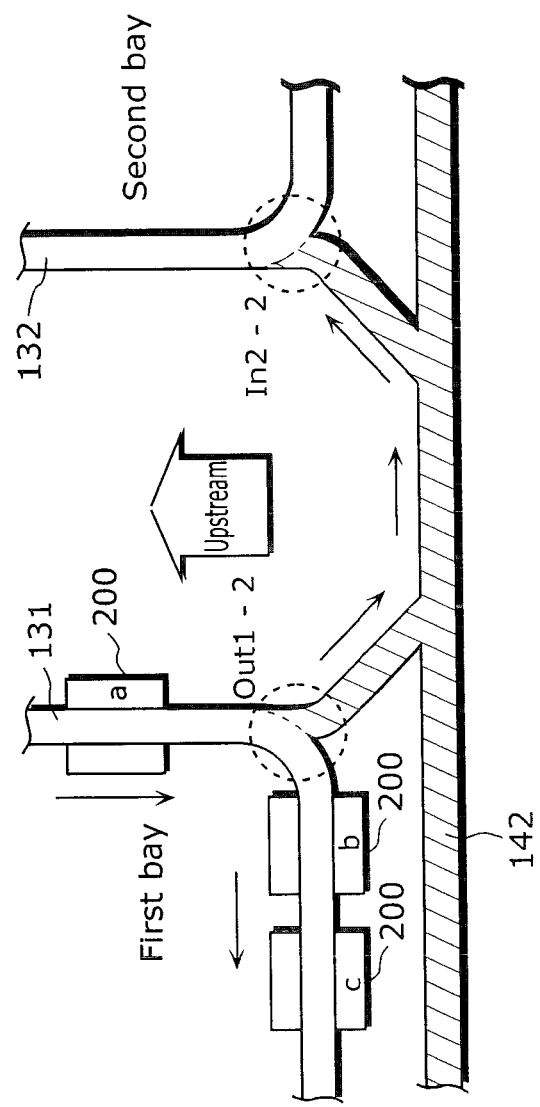
FIG. 7 illustrates how to specify one of traveling vehicles as a traveling vehicle to be dispatched.

Described first is a flow of a dispatching process in the traveling vehicle system 100 with reference to FIGS. 5 to 7.

FIG. 5 shows the dispatching process in the traveling vehicle system 100 according to the embodiment.

As shown in FIG. 5, assumed here is the case where there are six of the traveling vehicles 200 in first bay and one traveling vehicle 200 in the second bay at a certain point. Additionally assumed is the case where at least two traveling vehicles 200 are required for the production process of the second bay.

Through the first bay controller 121, the system controller 110 gives the one traveling vehicle 200 on the first closed path 131 an instruction to move to the second closed path 132.

FIG. 6 is a flow chart schematically showing a flow of the dispatching process executed by system controller 110 according to the embodiment.

The system controller 110 obtains the number of the traveling vehicles 200 in each bay (510). For example, the monitoring unit 116 obtains (i) from the first bay controller 121 the number of the traveling vehicles 200 found in first bay, and (ii) from the second bay controller 122 the number of the traveling vehicles 200 in the second bay. It is noted that the numbers are obtained at a predetermined interval, for example.

Further, the system controller 110 determines whether or not there is a need for dispatch (S11).

For example, the moving instructing unit 115 compares the actual number of the traveling vehicles 200 (one traveling vehicle) in the second bay with the reference number of the traveling vehicles 200 (two to four traveling vehicles) for the second bay. In addition, the moving instructing unit 115 compares the actual number of the traveling vehicles 200 (six traveling vehicles) in the first bay with the reference number of the traveling vehicles 200 (three to five traveling vehicles) for the first bay. It is noted that the reference number per bay is stored in the storage unit 112, for example.

Based on the comparison result, the moving instructing unit 115 determines to move one of the six traveling vehicles 200 in first bay to the second bay (S11: Yes).

It is noted another criterion than the above may be employed for determining whether or not there is a need for dispatch. For example, the following criterion may be applied: A bay having the number "N (N is an integer greater than 1)" of the traveling vehicles 200 receives one or more of the traveling vehicles 200 from a bay having the number "M (M is an integer greater than N)" of the traveling vehicles 200.

The moving instructing unit 115 refers to the exit point table 113 and the entrance point table 114 stored in the storage unit 112 (512).

The moving instructing unit 115 refers to the exit point table 113 and the entrance point table 114 in order to specify an exit point and an entrance point (S13). Here the exit point and the entrance point are respectively the start and the end of the traveling route from the first closed path 131 to the second closed path 132.

Specified here are the exit point "Out 1-2" on the first closed path 131 and the entrance point "In 2-2" on the second closed path 132.

Furthermore, the moving instructing unit 115 specifies a traveling vehicle 200 to be moved (S14).

In particular, the moving instructing unit 115 specifies a traveling vehicle 200 which is positioned (i) upstream of "Out 1-2"; namely, the exit point, and (ii) closest to "Out 1-2".

FIG. 7 illustrates how to specify one of the traveling vehicles 200 as the traveling vehicle to be dispatched.

As shown in FIG. 7, assumed here is the case where there are three of the traveling vehicles 200 (Traveling vehicle "a", Traveling vehicle "b", and Traveling vehicle "c") near "Out 1-2" at the moment when the moving instructing unit 115 determines the necessity for dispatch.

Now, Traveling vehicle "b" is the closest one to "Out 1-2". However, the first closed path 131 is the clockwise one-way traffic, and Traveling vehicle "b" is positioned downstream of "Out 1-2" in the one-way traffic. In other words, Traveling vehicle "b" cannot quickly arrive at "Out 1-2".

Hence, instead of Traveling vehicle "b", the moving instruction unit 115 specifies Traveling vehicle "a" because Traveling vehicle "a" is positioned upstream of "Out 1-2" and closest to "Out 1-2". In other words, Traveling vehicle "a" travels the shortest traveling distance required to arrive at "Out 1-2".

The moving instructing unit 115 gives the specified Traveling vehicle "a" an instruction to move from the first closed path 131 to the second closed path 132 (S15).

Specifically, through the first bay controller 121, the moving instructing unit 115 transmits to Traveling vehicle "a" information (i) obtained from the exit point table 113 and the entrance point table 114, and (ii) showing "Out 1-2" and "In 2-2".

Traveling vehicle "a" refers to the layout data of the traveling path included itself, and specifies a route to exit from the first closed path 131 at "Out 1-2" and enter in the second closed path 132 at "In 2-2". Furthermore, Traveling vehicle "a" moves on the specified route to enter in the second closed path 132.

It is noted that the system controller 110 carrying out the flow of the process may be introduced in a form of a computer system including a micro processor, a Read Only Memory (ROM), a Random Access Memory (RAM), a hard disc unit, and a program executing the above flow of the process.

As described above, the traveling vehicle system 100 in the embodiment includes the system controller 110 controlling each of the traveling vehicles 200.

The system controller 110 has the storage unit 112 storing the exit point table 113 and the entrance point table 114. The exit point table 113 and the entrance point table 114 represent information showing a combination of one of the exit points and one of the entrance points. The combination represents the start and the end of the shortest route on which the traveling vehicle 200 can move between the closed paths.

When the traveling vehicle 200 moves from one of the closed paths to another closed path, the above structure can easily specify a combination of an exit point and an entrance point so that the combination facilitates the most efficient travel of the traveling vehicle 200.

In other words, the traveling vehicle system 100 in the embodiment can specify a traveling route which allows an efficient travel of the traveling vehicles 200 with a short processing time and a little amount of load, eliminating the need for searching a traveling route having the shortest distance from among many candidate moving paths for example.

Furthermore, the system controller 110 specifies, as a traveling vehicle 200 to be moved, the traveling vehicle 200 having the shortest traveling distance required to arrive at a specified exit point from among the traveling vehicles 200 on the starting closed path.

In other words, the system controller 110 can specify the most suitable traveling vehicle 200 to be dispatched when, for example, dispatching one of the traveling vehicles 200 from one of two closed paths to the other. This operation makes possible improving dispatch efficiency.

It is noted that the generating unit 111 generates (including update of) the exit point table 113 and the entrance point table 114 when (i) the traveling vehicle system 100 is activated, and (ii) the layout of the traveling path is updated.

In the case where there are any problems, other than the above problems, contributing to the deterioration of the traveling environment in the traveling vehicle system 100, the generating unit 111 updates the exit point table 113 and the entrance point table 114 based on the problems.

Such problems include, for example, an unusable path due to congestion around the exit points and the entrance points, a broken traveling vehicle 200 closing the path, and the maintenance work.

Figure 8:
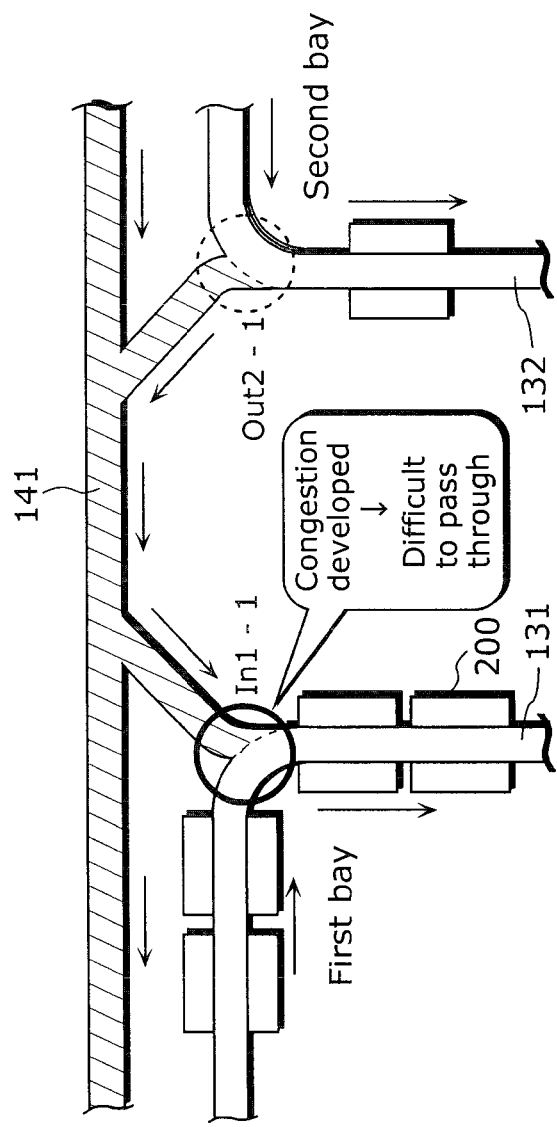
FIG. 8 shows the traffic congestion developed around the entrance point in the traveling vehicle system according to the embodiment.

FIG. 8 shows the traffic congestion developed around the entrance point in the traveling vehicle system 100 according to the embodiment.

As shown in FIG. 8, assumed is the case where some of the traveling vehicles 200 are around "In 1-1"; namely, the entrance point to the first closed path 131, and each of the traveling vehicles 200 stops for loading and unloading articles. Here it is difficult for the traveling vehicles 200 to pass through "In 1-1".

In order to handle the above problems, the traveling vehicle system 100 has the monitoring unit 116 monitor a traveling environment observed in a predetermined area at each of the exit point and the entrance point.

The traveling environment may be the number of the traveling vehicles 200 passing through the predetermined area per unit time. For example, the first bay controller 121 counts, at a predetermined interval, the number of the traveling vehicles 200 coming in the predetermined area including upstream and downstream of "In 1-1" of the first closed path 131, and the number of the traveling vehicles 200 going out of the predetermined area. Then the first bay controller 121 notifies the system controller 110 of the counting result.

The monitoring unit 116 in the system controller 110 receives the notification. In the case where the difference between the incoming traveling vehicles to and the outgoing traveling vehicles from the predetermined area becomes greater than a threshold value, the monitoring unit 116 determines that the congestion has developed around "in 1-1". In other words, the monitoring unit 116 determines that the traveling vehicles 200 have difficulty in getting to "In 1-1".

Furthermore, there is another case where the traveling vehicles 200 cannot path through an exit point and an entrance point due to an unusable path.

Figure 9:
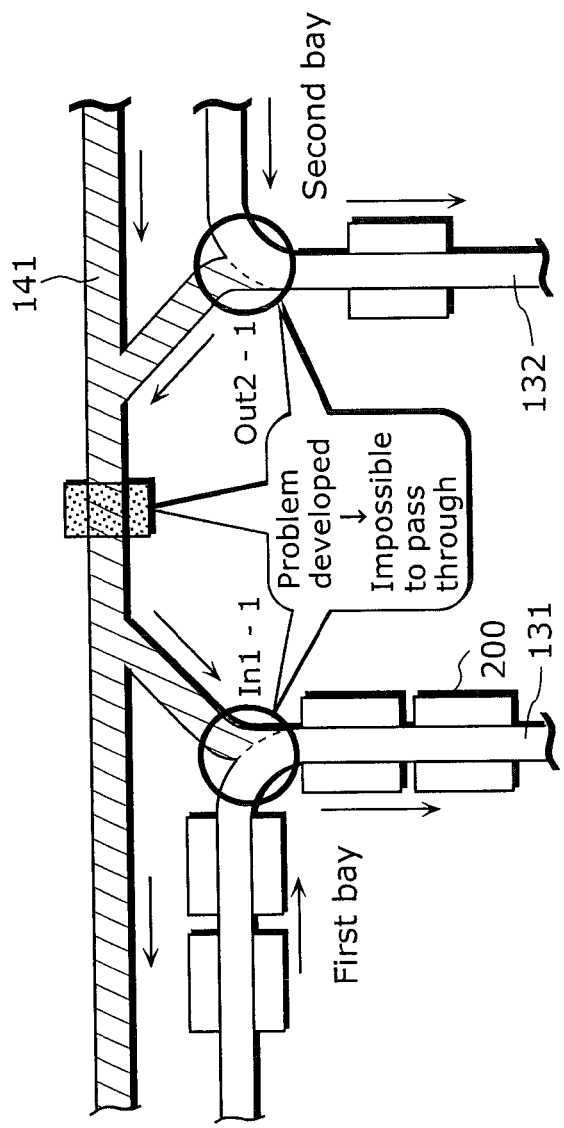
FIG. 9 shows the path being unusable in the traveling vehicle system according to the embodiment.

FIG. 9 shows the path being unusable in the traveling vehicle system 100 according to the embodiment.

As shown in FIG. 9, assumed is the case where one of the traveling vehicles 200 is down and stops in the middle (the dotted rectangle in FIG. 9) of the first bay and the second bay on the first connecting path 141, and makes the path unusable.

Here, when the traveling vehicles 200 exit at "Out 2-1" of the second closed path 132, the traveling vehicles 200 will be stacked on the first connecting path.

Moreover, none of the traveling vehicles 200 can get to "In 1-1" of the first closed path 131.

Thus, the unusable path on the traveling path in the traveling vehicle system 100 makes some of the exit points and the entrance points virtually unavailable.

Similar to the case of detecting the development of the above congestion, the monitoring unit 116 determines that a path has been unusable and where the unusable point is, based on the traveling environment in a predetermined area of the traveling path.

For example, when one of the traveling vehicles 200 breaks down and stops on the way from the second bay to the first bay, the monitoring unit 116 notifies the second bay controller 122 of the fact that the traveling vehicle 200 cannot move and of the position of the broken traveling vehicle 200.

The second bay controller 122 transmits to a system controller 110 information telling that the traveling vehicle 200 cannot move and showing the position of the broken traveling vehicle 200.

The monitoring unit 116 in the system controller 110 receives the information to specify the unusable part of the path and the traveling route including the unusable part. Hence the system controller 110 specifies the exit point and the entrance point that are virtually unavailable.

For example, the example in FIG. 9 shows that the monitoring unit 116 determines that "In 1-1" and "Out 2-1" are unavailable.

When the monitoring unit 116 determines that it is difficult or impossible to for the traveling vehicle 200 to pass through either any one of the exit points or any one of the entrance points, the generating unit 111 exclude the any exit point and the any entrance point for which it is determined that it is difficult or impossible for the traveling vehicle to pass through, and updates the exit point table 113 and the entrance point table 114.

Figure 10:
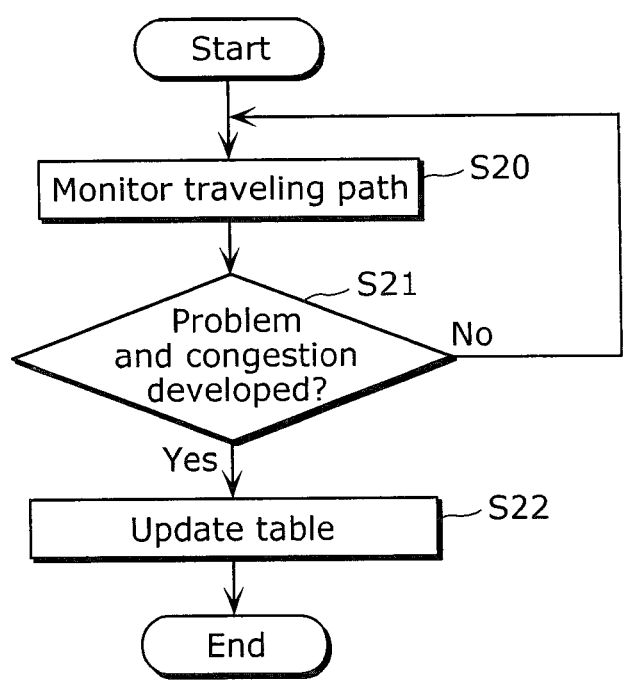
FIG. 10 shows a flow of a process by the system controller when a generating unit according to the embodiment updates an exit table and an entrance table.

FIG. 10 shows a flow of a process by the system controller 110 when the generating unit 111 according to the embodiment updates the exit point table 113 and the entrance point table 114.

The monitoring unit 116 monitors the traveling environment as described above (S20). When the monitoring unit 116 determines that it is difficult or impossible for the traveling vehicle 200 to pass through any one of the exit points or any one of the entrance points due to a problem or congestion developed on the traveling path (S21: Yes), the generating unit 111 updates the exit point table 113 and the entrance point table 114 (S22).

Figure 11:
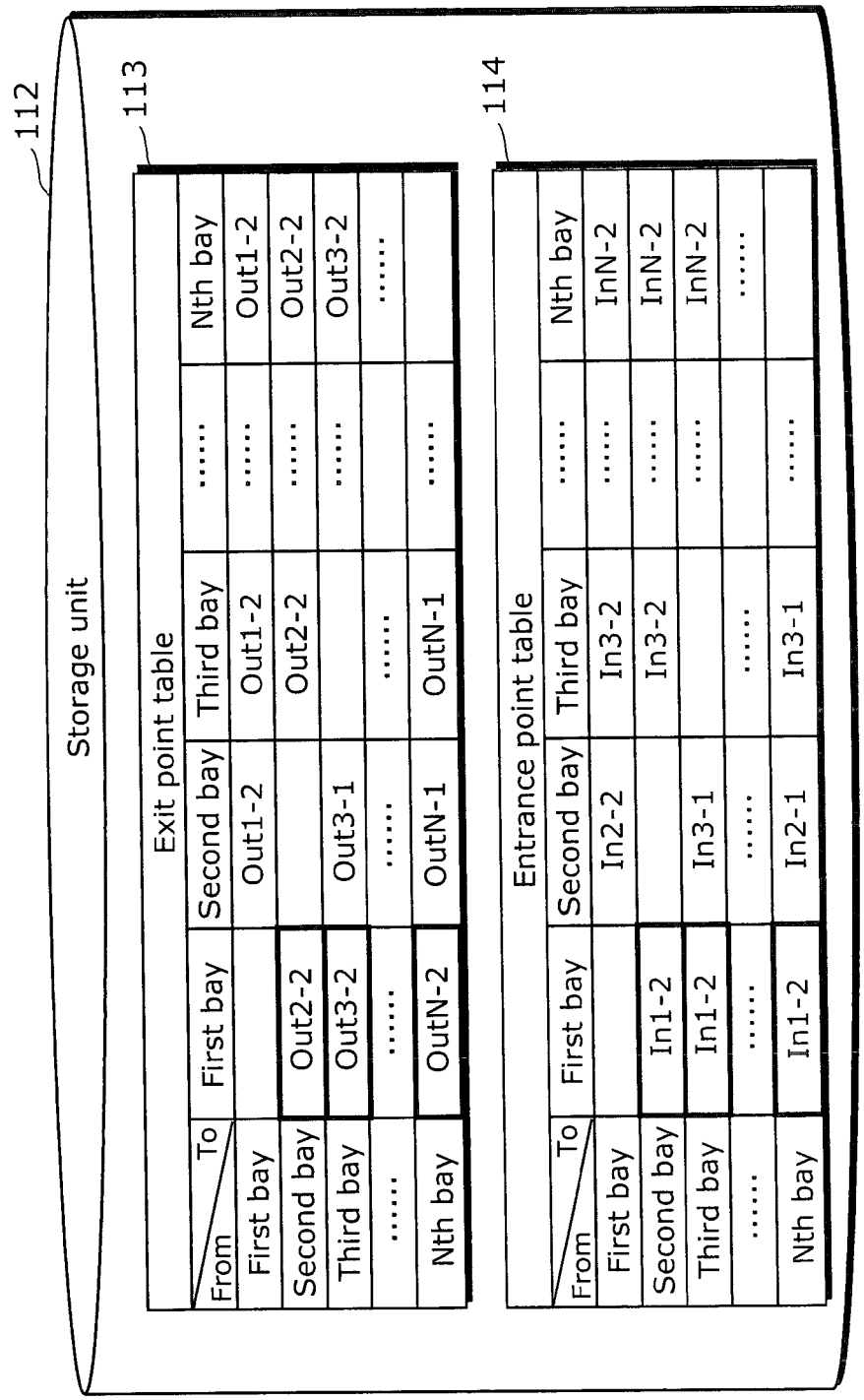
FIG. 11 exemplifies data formation of the exit table and the entrance table updated by the generating unit.

FIG. 11 exemplifies data formation of the exit point table 113 and the entrance point table 114 updated by the generating unit 111.

It is noted that FIG. 11 exemplifies data formation of the exit point table 113 and the entrance point table 114 updated according to the congestion shown in FIG. 8. The fields surrounded with bold frames on the exit point table 113 and the entrance point table 114 in FIG. 11 are the changed points by the update.

When the congestion shown in FIG. 8 develops in the traveling vehicle system 100, the traveling vehicles 200 have difficulty in passing through "In 1-1" as described above.

Hence the generating unit 111 updates the exit point table 113 and the entrance point table 114, excluding "In 1-1".

Thus "Out 2-2" is recorded on the exit point table 113, for example, as an exit point for the traveling route from the second bay to the first bay. Furthermore, since the exit point is changed to "Out 2-2", "In 2-2" is recorded on the entrance point table 114 as an entrance point for the traveling route from the second bay to the first bay.

In other words, the generating unit 111 excludes the exit points and the entrance points where it is difficult for the traveling vehicle 200 to pass under a situation with the deteriorated traveling environment such as the development of congestion, and finds the most efficient traveling route under the situation.

It is noted that the traveling route in this case is also found using a similar technique as that described above. In other words, the generating unit 111 specifies the route having the shortest distance from among all the combinations of non-excluded exit points and entrance points. Furthermore, the generating unit 111 records the both ends of the specified route; namely, the exit point and the entrance point, on the exit point table 113 and the entrance point table 114.

Hence, when moving from one of the two closed paths to the other after the update, the traveling vehicle 200 can arrive at the destination with the most efficient manner under the situation at that point. In addition, since the generating unit 111 excludes an exit point and an entrance point which are virtually unavailable, the traveling vehicle 200 never fails to arrive at the destination.

As described above, the traveling vehicle system 100 in the embodiment has the exit point table 113 and the entrance point table 114, showing efficient traveling routes of the traveling vehicle 200, updated when the traveling vehicle system 100 is activated, the traveling path layout is updated, and a problem to deteriorate the traveling environment, such as congestion, occurs.

Furthermore, the updated exit point table 113 and entrance point table 114 are stored in the storage unit 112. Thus the moving instructing unit 115 can always refer to the most recent exit point table 113 and entrance point table 114.

Thus, the traveling vehicle system 100 can efficiently move the traveling vehicles 200 when a specified one of the traveling vehicles 200 transports an article between bays, as well as when two or more of the traveling vehicles 200 are dispatched.

Figure 12:
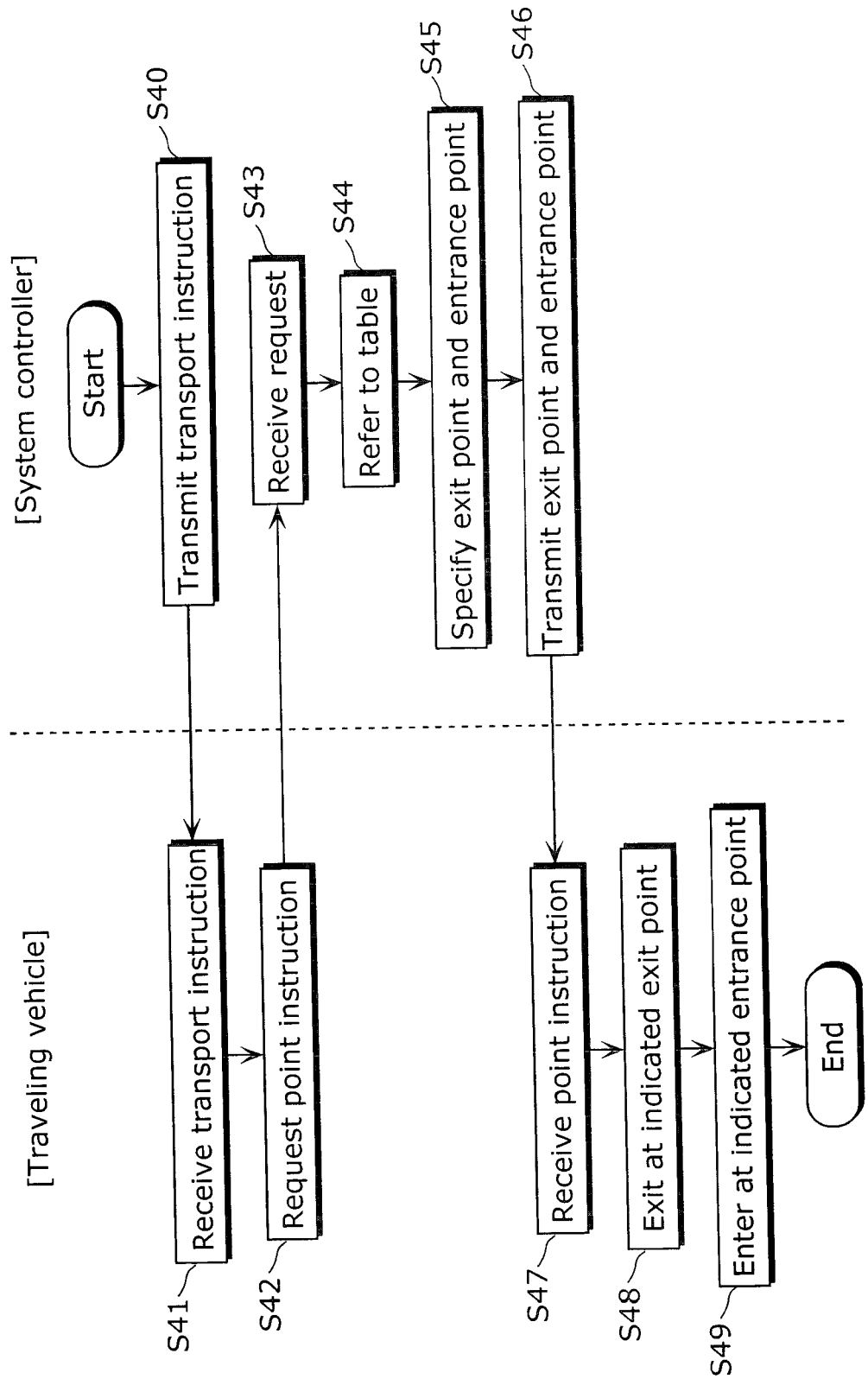
FIG. 12 exemplifies a flow of a process and operations of a specified traveling vehicle and the system controller when the specified traveling vehicle transports an article between bays.

FIG. 12 exemplifies a flow of a process and operations of a specified one of the traveling vehicles 200 and the system controller 110 when the specified traveling vehicle 200 transports an article between bays.

It is noted that the system controller 110 and the traveling vehicle 200 exchange information with each other via the first bay controller 121 and the second bay controller 122. The first bay controller 121 and the second bay controller 122, however, are not involved in substantial processing details, and are omitted in the description of the flow of the process.

Here, for example, assume the case where a material "a" placed at a predetermined position in first bay needs to be transported to a predetermined machine in the second bay. Here the moving instructing unit 115 in the system controller 110 specifies one of the traveling vehicles 200 (Traveling vehicle "a") found near and upstream of the material "a". The moving instructing unit 115 further transmits to Traveling vehicle "a" a transport instruction in order to transport the material "a" to a predetermined position in the second bay (S40).

Upon receiving the transport instruction (S41), Traveling vehicle "a" transmits a point indication request to the system controller 110 (S42).

When the system controller 110 receives the point indication request (S43), the generating unit 111 refers to the exit point table 113 and the entrance point table 114 stored in the storage unit 112 (S44).

It is noted that the storage unit 112 stores the exit point table 113 and the entrance point table 114 shown in FIG. 4.

The generating unit 111 refers to the exit point table 113 and the entrance point table 114 to specify "Out 1-2" of the first closed path 131 and "In 2-2" of the second closed path 132 (S45). "Out 1-2" and "In 2-2" are respectively an exit point and an entrance point on the traveling route from the first bay to the second bay.

The generating unit 111 transmits, to Traveling vehicle "a", information showing the specified "Out 1-2" and "In 2-2" as point indicating information (S46).

Traveling vehicle "a" receives the point indicating information (S47). Then Traveling vehicle "a" exits from the first closed path 131 at "Out 1-2" indicated in the point indicating information (S48). When exiting from the first closed path 131, Traveling vehicle "a" moves to the second closed path 132 and enters in the second closed path 132 at "In 2-2" indicated in the point indicating information (S49).

Hence, in response to the request from the traveling vehicle 200, the system controller 110 can transmit the point indicating information, indicating an exit point and an entrance point, to the traveling vehicle 200.

The point indicating information transmitted here is obtained from the exit point table 113 and the entrance point table 114 stored in the storage unit 112 at that point.

In other words, the point indicating information to be transmitted to the traveling vehicle 200 is generated according to the information on congestion and a problem of the traveling path developing at that point. Thus the point indicating information indicates the ends of the most efficient route at that time on which the traveling vehicle never fails to arrive at the destination.

It is noted that in the above example, there could be another case where the material "a" is found near and downstream of "Out 1-2", and Traveling vehicle "a" having the material "a" has to travel a relatively long traveling distance required to arrive at "Out 1-2".

Hence it may be more efficient to have Traveling vehicle "a" exit at another exit point than "Out 1-2".

However, Traveling vehicle "a" may have difficulty in arriving at the destination or may be unable to arrive at the destination due to the problems including congestion, as described above.

Thus, when a specified traveling vehicle 200 moves from one of the two closed paths to the other, the system controller 110 shows an exit point and an entrance point based on the most recently updated exit point table 113 and entrance point table 114.

Hence, even though congestion has developed, the traveling vehicle 200 can move on the most efficient route under the situation in which the traveling vehicle 200 never fails to arrive at the closed path of the destination.

As described above, the traveling vehicle system 100 according to the embodiment of the present invention includes closed paths and a connecting path connecting the closed paths with each other, and successfully operates traveling vehicles between the clothed paths.

It is noted that, in the embodiment, the exit point table 113 and the entrance point table 114 are stored in the storage unit 112 of the system controller 110 controlling the traveling vehicles 200.

Instead, each of the traveling vehicles 200 may store the exit point table 113 and the entrance point table 114, and refer to the tables when moving between the closed paths.

In this case, the traveling vehicle 200 can determine a route on which efficient travel is available by simply referring to the tables, eliminating the need for searching for the shortest route every time the traveling vehicle 200 moves between the closed paths.

Moreover, the traveling vehicle 200 may include the generating unit 111 and the monitoring unit 116. In other words, the traveling vehicle 200 may monitor the traveling environment observed in a predetermined area of the traveling path, and update the exit point table 113 and the entrance point table 114 based on the development of the congestion.

Thanks to the above structure, even in the case where the communication is down between the traveling vehicle 200 and the system controller 110 due to deterioration of the communication environment, the traveling vehicle 200 can easily determine a route on which efficient travel is available.

In the embodiment, when informed of the exit point and the entrance point by the system controller 110, the traveling vehicle 200 refers to the layout data stored therein to determine a traveling route.

Instead, the system controller 110 may determine the traveling route of the traveling vehicle 200. In other words, as far as the traveling vehicle 200 can move via the exit point and the entrance point shown in the exit point table 113 and the entrance point table 114, the traveling route including the points may be given from an apparatus other than the traveling vehicle 200.

In the embodiment, the generating unit 111 obtains the point information showing exit points and entrance points of each of the closed paths, and calculates traveling distances for all the combinations of the exit points and the entrance points which the traveling vehicle 200 can take.

However, the generating unit 111 does not necessarily calculate the traveling distances. For example, the generating unit 111 may obtain the traveling distances calculated by another apparatus, and generate the exit point table 113 and the entrance point table 114 based on the obtained traveling distances.

In the embodiment, the traveling vehicles 200 for the traveling vehicle system 100 are overhead traveling vehicles.

Instead, the traveling vehicle system 100 may have another kind of traveling vehicles than the overhead traveling vehicles, and control the operations of the other kind of traveling vehicles.

For example, the traveling vehicle system 100 may control the operations of an automated guided vehicle moving on the floor and conveying articles in a warehouse and a factory.

For example, assumed is the case where there are areas separated for each production process of electronic components and electronic devices, and each area has at least one exit and one entrance.

Here the traveling vehicle system 100 can efficiently operate the automated guided vehicle when the vehicle is dispatched from one of two areas to the other.

In the embodiment, the system controller 110 substantially controls the traveling vehicles 200, and the first bay controller 121 and the second bay controller 122 are not involved in substantial processing details.

Instead, for example, the system controller 110, the first bay controller 121, and the second bay controller 122 may separate roles and co-operate each other to control each of the traveling vehicles 200.

In other words, the controller for the traveling vehicle system in the present invention may be positioned on a higher level in command than the traveling vehicles in order to control the traveling vehicles. The structure of the controller shall not be limited to a specific one.

INDUSTRIAL APPLICABILITY

The traveling vehicle system in the present invention efficiently operates the traveling vehicles. Thus the traveling system can be employed as a system for transporting various kinds of articles in a predetermined area, using the traveling vehicles. In particular, the traveling vehicle system is useful for a factory having closed paths each handling a different production process.

REFERENCE SIGNS LIST

- 100 Traveling vehicle system
- 110 System controller
- 111 Generating unit
- 112 Storage unit
- 113 Exit point table
- 114 Entrance point table
- 115 Moving instruction unit
- 116 Monitoring unit
- 121 First bay controller
- 122 Second bay controller
- 131 First closed path
- 132 Second closed path
- 141 First connecting path
- 142 Second connecting path
- 200 Traveling vehicle
- 240 Holding unit
- 300 Platform

The invention claimed is:

1. A traveling vehicle system comprising:
   closed paths each of which is a one-way path;
   a connecting path which is a one-way path and connects said closed paths with each other; and
   a traveling vehicle which moves along said closed paths and said connecting path,
   wherein each of said closed paths having (i) exit points at which said traveling vehicle can exit to the connecting path and (ii) entrance points at which said traveling vehicle can enter from the connecting path,
   said traveling vehicle system further comprises
   a storage unit configured to store exit-entrance information showing a combination of an exit point and an entrance point respectively representing a start and an end of a shortest route on which said traveling vehicle can move between said closed paths, the exit point and the entrance point being respectively included in the exit points and the entrance points, and
   when moving from one of said closed paths to an other one of said closed paths, said traveling vehicle moves via the exit point of the one of said closed paths, and the entrance point of the other one of said closed paths, the exit point and the entrance point being shown in the exit-entrance information stored in said storage unit.

2. The traveling vehicle system according to claim 1, further comprising:
   a generating unit configured to generate the exit-entrance information based on information showing the exit points and the entrance points of each of the closed paths; and
   a monitoring unit configured to monitor a traveling environment to determine whether or not it is difficult or impossible for the traveling vehicle to pass through either any one of the exit points or any one of the entrance points of each of the closed paths, the traveling environment being monitored in a predetermined area of a traveling path formed of the closed paths and the connecting path,
   wherein, in the case where said monitoring unit determines that it is difficult or impossible for the traveling vehicle to pass through either the any one of the exit points or the any one of the entrance points of each of the closed paths, said generating unit is configured to exclude the any exit point and the any entrance point for which it is determined that it is difficult or impossible for the traveling vehicle to pass through, and update the exit-entrance information.

3. The traveling vehicle system according to claim 1, further comprising:
   traveling vehicles including the traveling vehicle; and
   a controller which controls each of said traveling vehicles,
   wherein said controller includes:
   said storage unit; and
   a moving instructing unit configured to give, when moving one of said traveling vehicles from one of the closed paths to an other one of the closed paths, an instruction to said one traveling vehicle so that said one traveling vehicle moves via the exit point of the one of the closed paths and the entrance point of the other one of the closed paths, the exit point and the entrance point being shown in the exit-entrance information stored in said storage unit.

4. The traveling vehicle system according to claim 3, wherein, when moving said one traveling vehicle from the one closed path to the other closed path, said moving instructing unit is configured to specify, as said one traveling vehicle, a traveling vehicle positioned upstream of and closest to the exit point indicated in the exit-entrance information, and give the instruction to said specified traveling vehicle.

* * * * *